United States Patent [19]

Ajmera et al.

[11] Patent Number: 4,891,178
[45] Date of Patent: Jan. 2, 1990

[54] METHOD OF MAKING PARTIALLY CRYSTALLINE BIAXIALLY ORIENTED HOLLOW PLASTIC FREE STANDING CONTAINERS

[75] Inventors: Prakash R. Ajmera, Toledo; Saleh A. Jabarin, Holland, both of Ohio

[73] Assignee: Owens-Illinois Plastic Products Inc., Toledo, Ohio

[21] Appl. No.: 201,267

[22] Filed: May 5, 1988

Related U.S. Application Data

[63] Continuation of Ser. No. 20,830, Mar. 2, 1987, abandoned.

[51] Int. Cl.$^4$ .................. B29C 49/18; B29C 49/64
[52] U.S. Cl. ................................ 264/521; 264/526; 264/530; 264/535
[58] Field of Search ............. 264/521, 523, 526, 528, 264/529, 530, 535, 542; 425/526, 530, 534, 538

[56] References Cited

U.S. PATENT DOCUMENTS 4,224,263  9/1980  Kontz ................................. 264/521
4,233,022  11/1980  Brady et al. ...................... 264/521
4,385,089  5/1983  Bonnebat et al. ................. 264/523

Primary Examiner—James Lowe
Assistant Examiner—Neil M. McCarthy

[57] ABSTRACT

A method for making a partially crystalline, biaxially oriented heat set hollow polyethylene terephthalate free standing container from a hollow parison having an open end and a closed end including engaging the open end of a plastic parison which is at a temperature within its molecular orientation temperature range, positioning a mold base in axial alignment with said engaged hot parison, enclosing a hot mold about the mold base, the mold being at heat setting temperature and the mold base being at a temperature preferably significantly lower than the mold, expanding the plastic parison within the hot mold and mold base by internal pressurization to induce biaxial orientation of the plastic parison and force the plastic parison into intimate contact and conformance with the hot mold and to maintain contact by such internal pressurization between the mold and mold base and the biaxially oriented container for a time sufficient to induce partial crystallization in the side wall and base of the biaxially oriented container, reducing the internal pressure in the blown container, opening the hot mold while maintaining engagement of the open end of the blown hollow container, disengaging the hot mold base from the blown container, maintaining a lower internal pressurization of the container to prevent significant shrinkage, and engaging a cold mold base with the base of the container, and enclosing a cold mold about the container and the mold base to cool the container while maintaining engagement of the open end with the container and maintaining pressure in the container at least sufficient to prevent shrinkage, and opening the cold mold and releasing the container.

6 Claims, 12 Drawing Sheets

METHOD OF MAKING PARTIALLY CRYSTALLINE BIAXIALLY ORIENTED HOLLOW PLASTIC FREE STANDING CONTAINERS

This application is a continuation of application Ser. No. 020,830, filed Mar. 2, 1987, now abandoned. This invention relates to making hollow biaxially oriented heat set partially crystalline articles and particularly articles made of polyethylene terephthalate.

BACKGROUND AND SUMMARY OF THE INVENTION

It has heretofore been known that the thermal stability and barrier properties of oriented blow molded containers of polyethylene terephthalate are significantly increased by heat setting. Typical processes for heat setting are shown in U.S. Pat. Nos. 4,476,170, 4,512,948 and 4,522,779.

In U.S. Pat. Nos. 4,476,170 and 4,512,948, there is disclosed an article and a process of making an oriented and heat set blow molded container of polyethylene terephthalate. In the process, a preform preheated to a temperature suitable for orientation is biaxially stretched in a blow mold and then while the hollow container is still in contact with the blow mold walls, the article is raised to a higher heat setting temperature preferably in the range of 200°–250° C. (except for the neck) thus heat setting the container, and while the container is still at a shrinkage resisting pressure exceeding atmospheric, it is cooled in the same mold to a temperature at which it maintains its shape when not pressurized but not below 100° C. It is also particularly disclosed that this cooling step can be done in the air outside the mold while maintaining internal pressure. According to these patents, when the heat setting temperature of the hot mold ranges from 220°–250° C. and the quenching temperature is not below 100° C., higher onset-of-shrinkage temperatures are obtained.

In U.S. Pat. No. 4,522,779, there are disclosed improved plastic containers and a process for their production. In the first embodiment, a container is blow molded in a first hot blow mold, then reblown to a larger size in a second cold mold of larger volume than the first hot mold. Such containers are stated as having improved mechanical properties, particularly very high hoop yield stresses. However, the utilization of a larger volume cold mold substantially reduces the thermal stability. In the second embodiment, a container is blow molded in a hot blow mold, then reblown to a larger size in a second hot blow mold where it is blown to the confines of the second mold and the container is then removed from the second hot mold and transferred to a third cold mold and cooled to room temperature while maintaining internal pressure. In a further embodiment, the container is blow molded in a first hot mold, reblown in a second hot mold, and thereafter the second mold is cooled to cool the container.

U.S. Pat. No. 4,385,089 (British Patent Specification No. 1,604,203) is directed to heat set biaxially oriented hollow articles and states that the preform or parison should be heated at least to biaxially orientation temperature and maintained in closed contact with a hot mold, which is at a temperature of up to 40° C. above the minimum orientation temperature. In one embodiment, the resultant molded hollow article is moderately cooled causing a temperature drop of 10°–30° C. by introducing cooling vapor or mist into the hollow article, interrupting the cooling vapor, and opening the mold. In another embodiment, the heat set article is allowed to shrink freely and then reblown in the same hot mold or in a separate cooled mold. The patent calls for a heat setting temperature of 40° C. above the orientation temperature which limits thermal stability and barrier properties.

According to this patent, the temperature of the hot mold should be maintained between 30° and 50° C. above the minimum orientation temperature of the plastic material. Otherwise, it is stated there are numerous disadvantages including lowering of the production rate, the danger of the appearance of major distortion and major shrinkage on mold release, the disadvantage inherent in heating metal molds to very high temperatures and keeping them at such temperatures, and the danger of crystallization which would cause a loss of transparency. Further, in accordance with this prior patent, excessive shrinkage is to be avoided and generally the temperature drop of 10° to 30° C. should be made. Accordingly, such a method precludes obtaining a degree of heat setting which would produce thermal stability at higher temperatures as may be required in filling the container with various products In addition, such a method will preclude obtaining the higher degrees of crystallinity and resultant high barrier properties which are required for some products.

In copending application, Ser.. No. 923,503 filed Oct. 27, 1986, and now abandoned, there are disclosed improved plastic containers and a method for their manufacture. In this method, the container is blow molded in the first hot mold which is maintained at 130°–250° C., the container is in contact with the mold surface for a short period of time (1–10 sec.) which is sufficient to induce partial crystallization. The container is then maintained at lower internal pressure to prevent significant shrinkage and then the container is rapidly transferred into a cold mold having substantially the same volume or smaller volume than the hot mold. The temperature of the cold mold is maintained at 1°–100° C. The container is quenched in the cold mold. The method results in a thermally stable container which has higher onset-of-shrinkage temperature and higher mechanical properties as required for hot fill applications. The method also provides lower cycle time.

Where the base of the container is complex such as having axially projecting portions so that it is free standing or has an inverted bottom, transfer from a hot mold to a cold mold, while the interior of the container is under pressure, tends to deform the bottom and cause it to revert to a hemispherical bottom. This tends to occur both when the blown container is maintained stationary and when the container is moved from a hot mold to a cold mold.

To overcome these problems in our copending application Ser. No. 021,894, filed Mar. 4, 1987, filed concurrently herewith, there is disclosed a method for making a partially crystalline, biaxially oriented heat set hollow plastic container from a hollow parison having an open end and a closed end comprising engaging the open end of a plastic parison which is at a temperature within its molecular orientation temperature range, positioning a mold base in axial alignment with said engaged hot parison, enclosing a hot mold about the mold base, the mold being at heat setting temperature, expanding the plastic parison within the hot mold and mold base by internal pressurization to induce biaxial orientation of the plastic parison and force the plastic parison into intimate contact and conformance with the hot mold and to maintain contact by such internal pressurization between the mold and the biaxially oriented container for a time sufficient to induce partial crystallization in the biaxially oriented container, reducing the internal pressure in the blown container, opening the hot mold while maintaining engagement of the open end and engagement of the mold base with the blown hollow container, maintaining a lower internal pressurization of the container to prevent significant shrinkage, and cooling the container while maintaining engagement of the open end and engagement of the mold base with the container and maintaining pressure in the container at least sufficient to prevent shrinkage.

U.S. Pat. No. 4,233,022 discloses a method and apparatus which a parison is blown and heat treated in a single hot mold. After blowing, the blowpressure is preferably maintained in the interior of the blown article in order to resist heat shrinkage during the heat treating and to maintain the material against the cavity wall. Selected portions of a biaxially oriented hollow bottle are heated while cooling other portions. More specifically, the body is differentially heat treated while less oriented portions such as the finish or the heel are either cooled or heat treated. According to the patent, the body of the bottle is heated to a temperature within the range of 150° C. to 220° C. for heat treating. According to the patent, the bottom of the bottle may be cooled in the event that very little molecular orientation is developed or alternatively may be heated to a temperature within the range of from 100° C. to 200° C. if heat treating is appropriate. The remaining less oriented portions such as the bottom are cooled or heat treated. As described, the heat treating cycle may range between 10 seconds to about 10 minutes. After heat treating, coolant fluid is circulated through ducts in the mold to cool the article to self-sustaining condition. Added cycle time is required after heat treating to cool mold from the heat treating temperature to the cooling temperature. Thus, the method requires a high overall cycle time due to the time for heat setting and the time necessary for cooling the mold and then for cooling the container to self-sustaining condition before removal from the mold.

Among the objectives of the present invention are to provide a method for heat setting free standing containers which method has lower cycle times; where the hot mold in which the container is blown and heat set can be opened sooner without deformation of the bottom as would occur due to internal pressure which is used to handle the container without shrinkage; which method permits the container to be transferred more rapidly between a hot mold and a cold mold; which method does not require maintaining contact between a mold base and the bottom or base of the container during movement from a hot mold to a cold mold.

In accordance with the invention, a method for making a partially crystalline, biaxially oriented heat set hollow polyethylene terephthalate free standing container from a hollow parison having an open end and a closed end comprising engaging the open end of a plastic parison which is at a temperature within its molecular orientation temperature range, positioning a mold base in axial alignment with said engaged hot parison, enclosing a hot mold about the mold base, the mold being at heat setting temperature and the mold base being at a temperature preferably significantly lower than the mold, expanding the plastic parison within the hot mold and mold base by internal pressurization to induce biaxial orientation of the plastic parison and force the plastic parison into intimate contact and conformance with the hot mold and to maintain contact by such internal pressurization between the mold and mold base and the biaxially oriented container for a time sufficient to induce partial crystallization in the side wall and base of the biaxially oriented container, reducing the internal pressure in the blown container, opening the hot mold while maintaining engagement of the open end of the blown hollow container, disengaging the hot mold base from the blown container, maintaining a lower internal pressurization of the container to prevent significant shrinkage, and engaging a cold mold base with the base of the container, and enclosing a cold mold about the container and the mold base to cool the container while maintaining engagement of the open end with the container and maintaining pressure in the container at least sufficient to prevent shrinkage, and opening the cold mold and releasing the container.

DESCRIPTION

Figure 1:
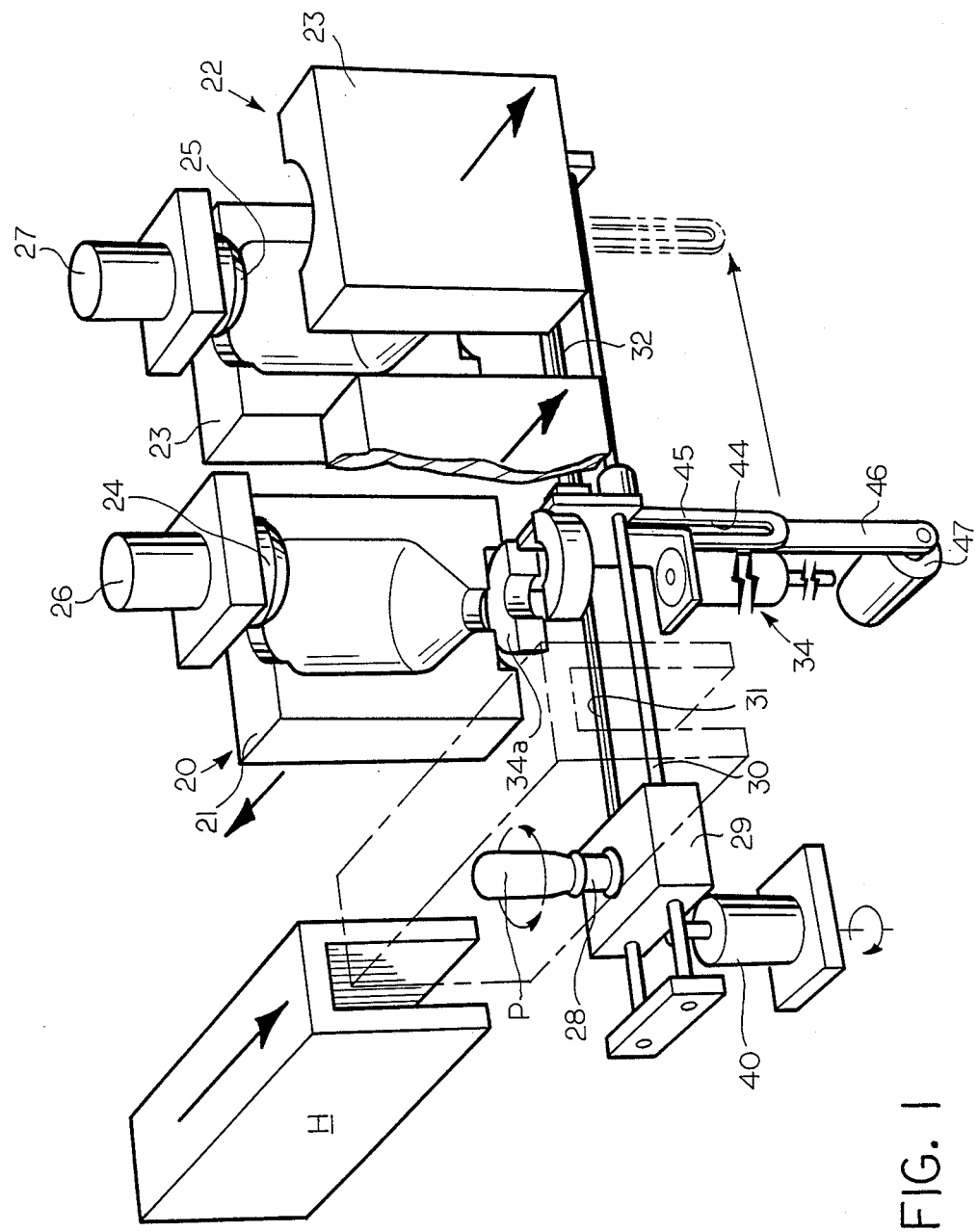
FIGS. 1-4 are partly diagrammatic views of an apparatus for performing the method comprising the invention.
Figure 2:
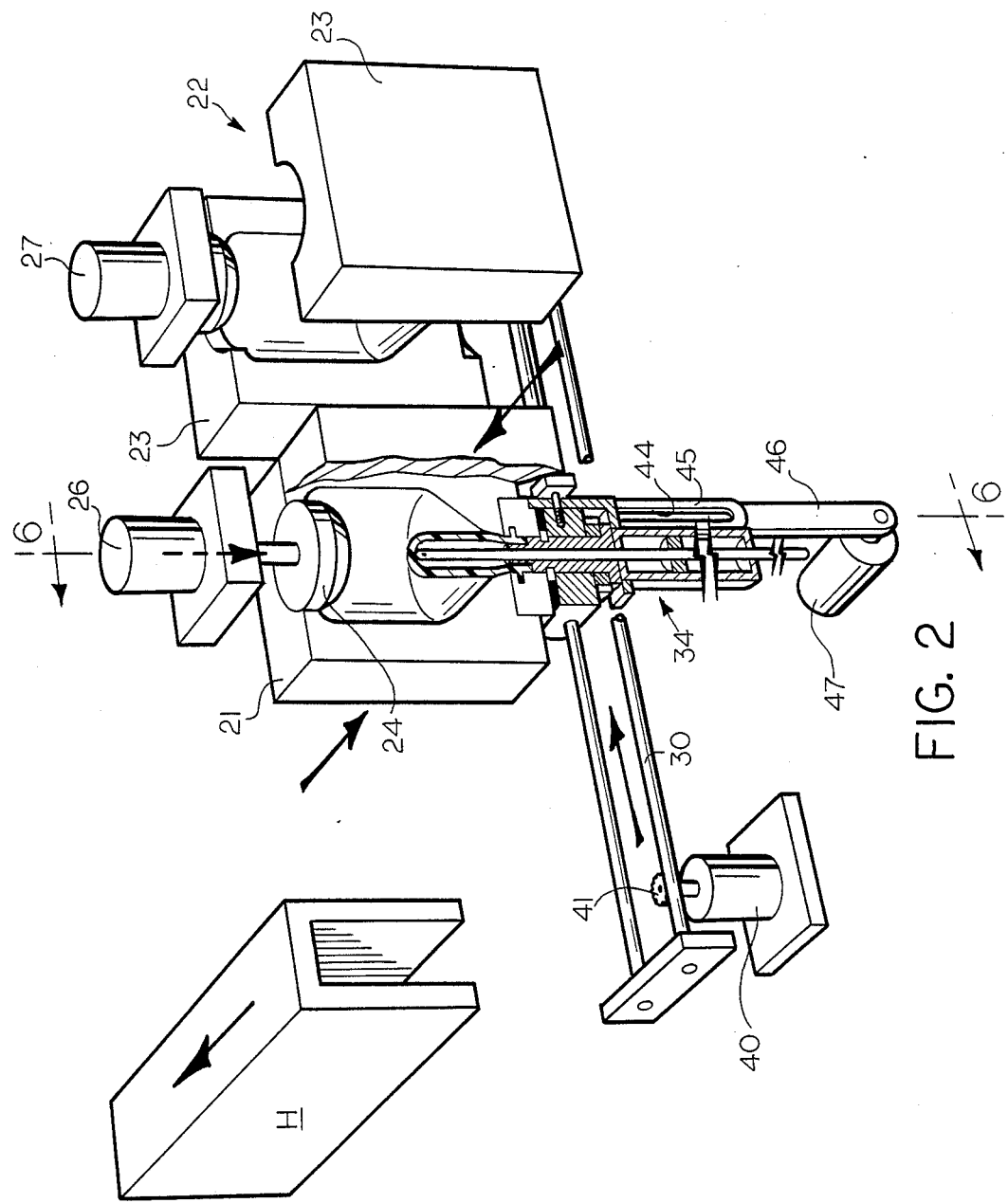
Figure 3:
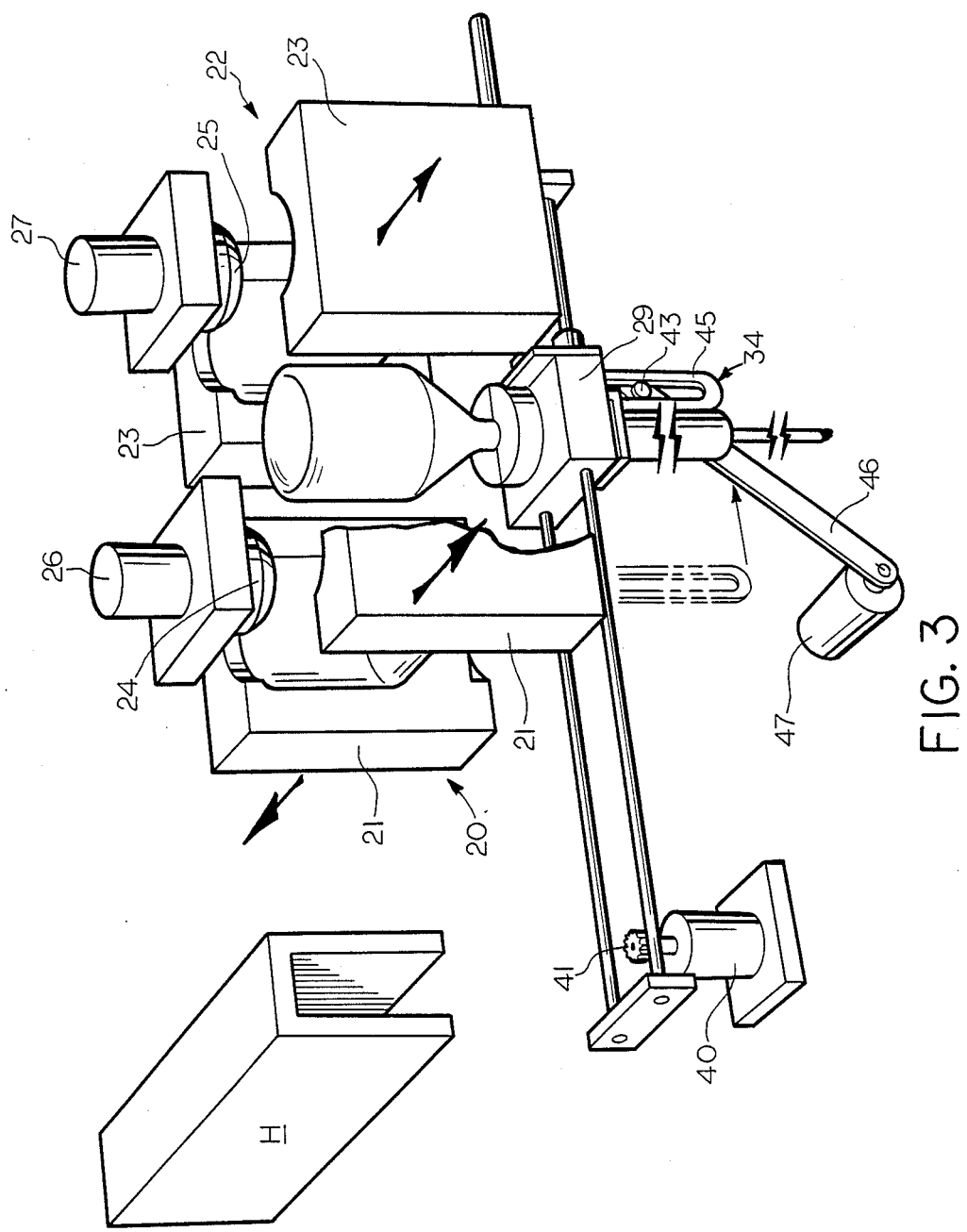
Figure 4:
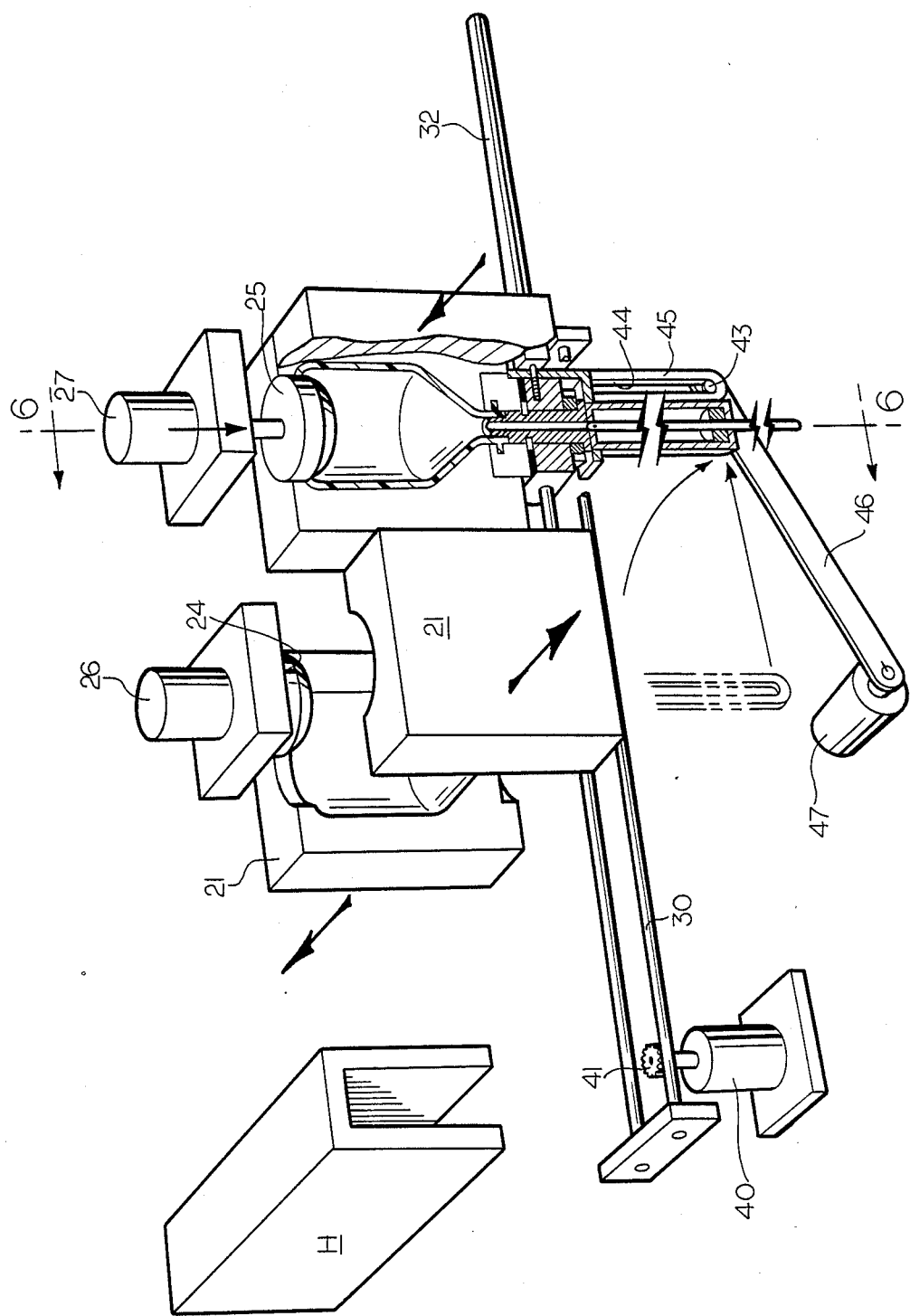
Figure 6:
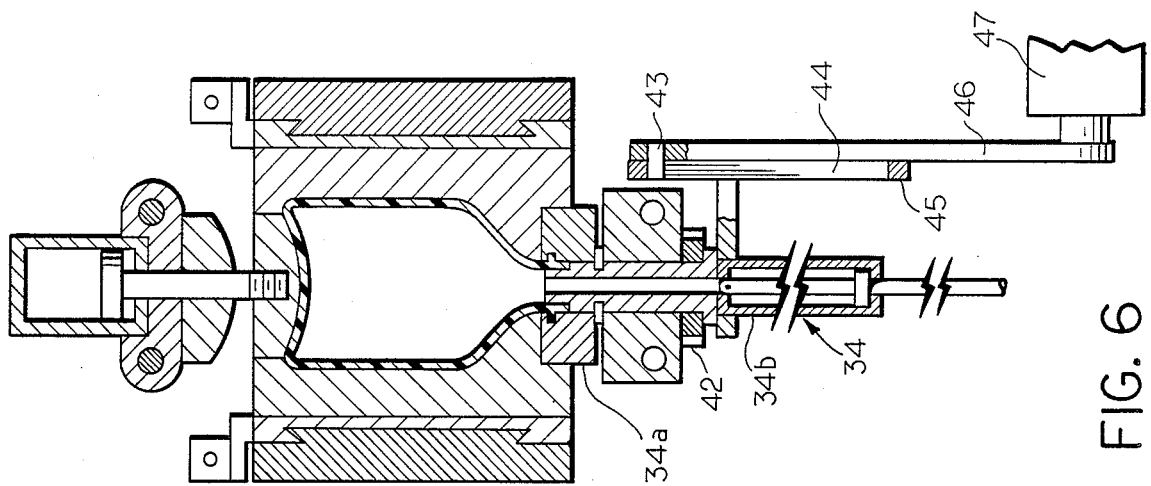
FIG. 6 is a transverse sectional view taken along the line 6—6 in FIG. 2.
Figure 5:
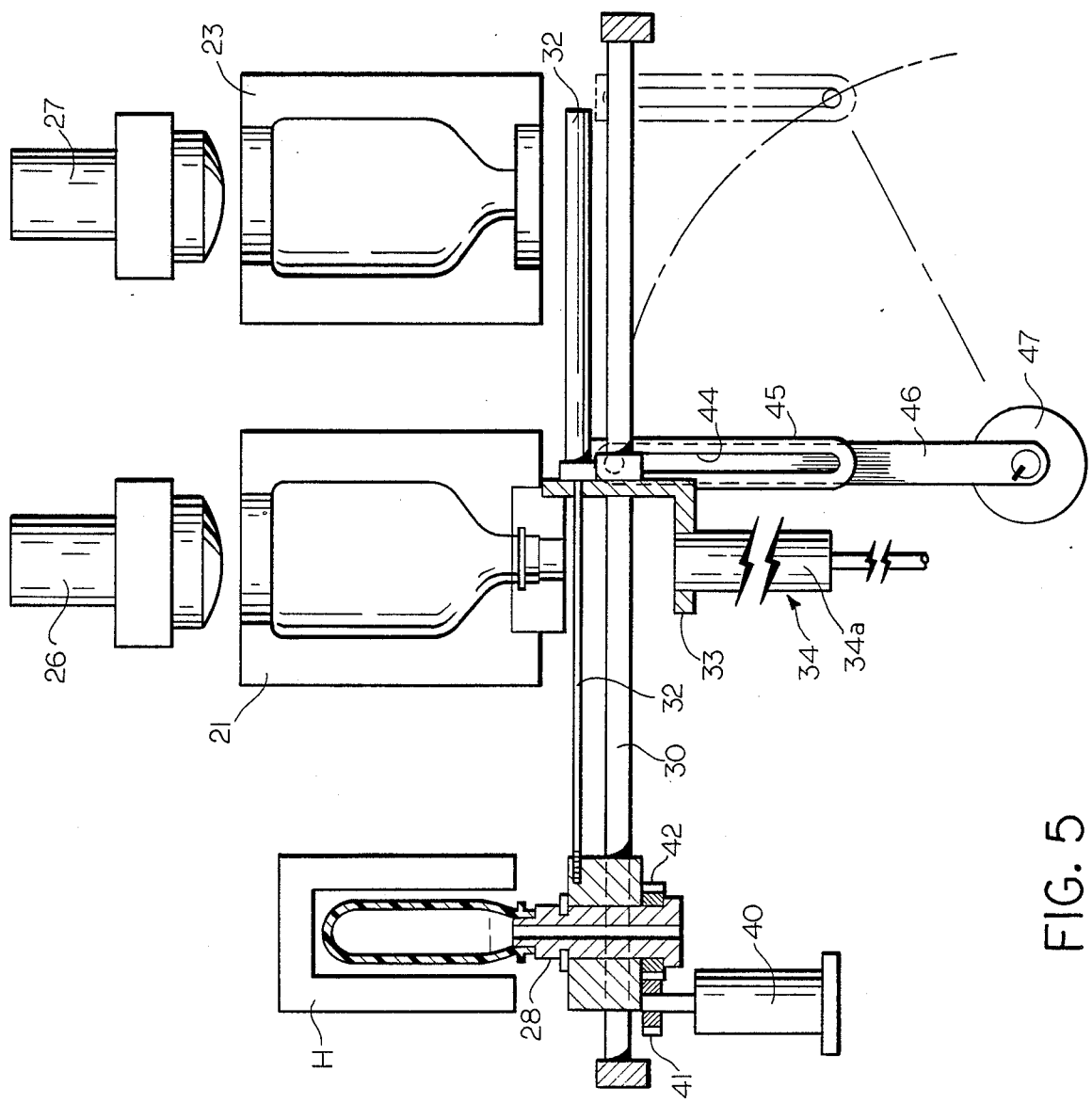
FIG. 5 is a fragmentary longitudinal sectional view of the apparatus of FIGS. 1-4.
Figure 7:
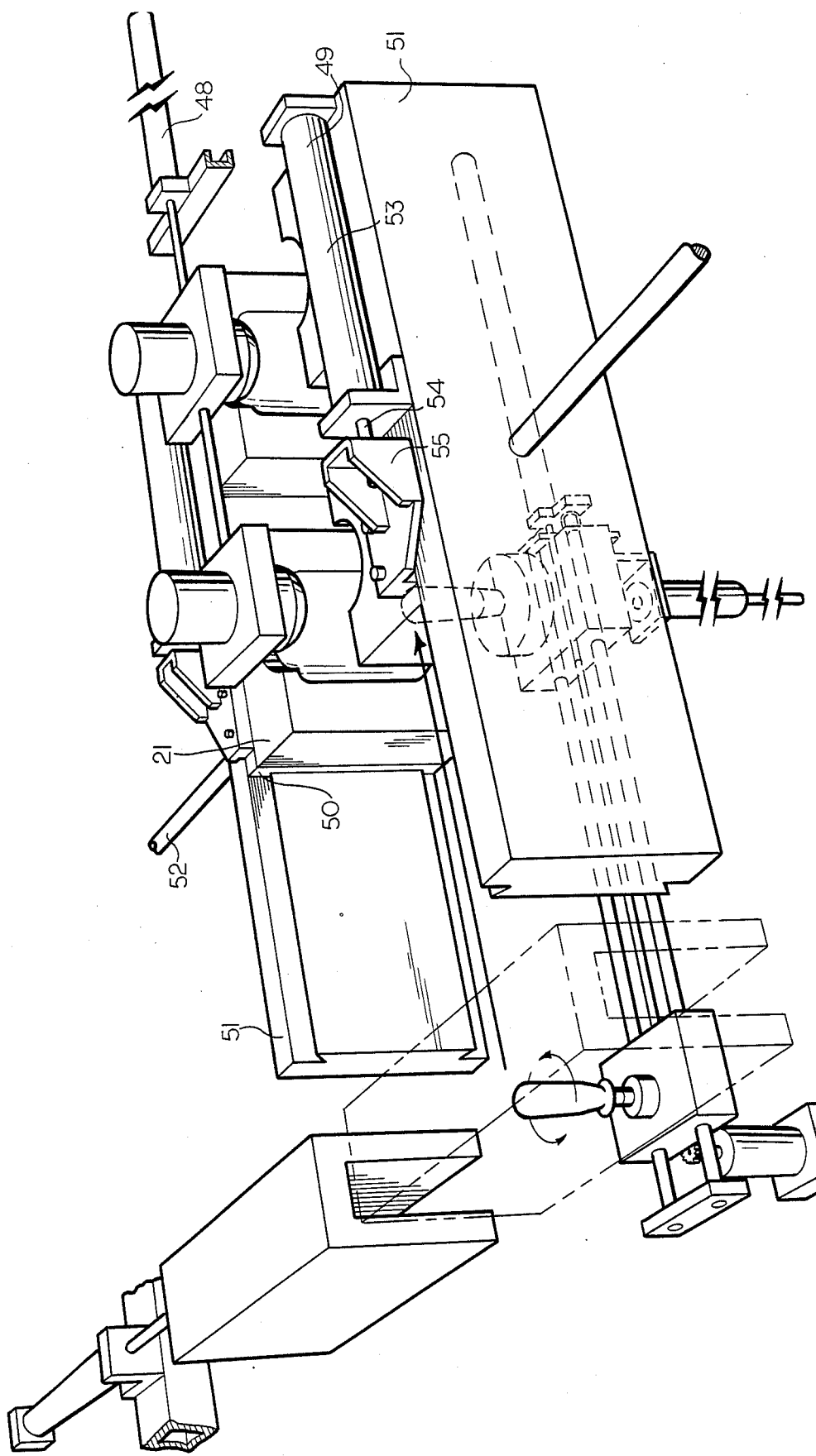
FIGS. 7-11 are partly diagrammatic views of a modified form of method.
Figure 8:
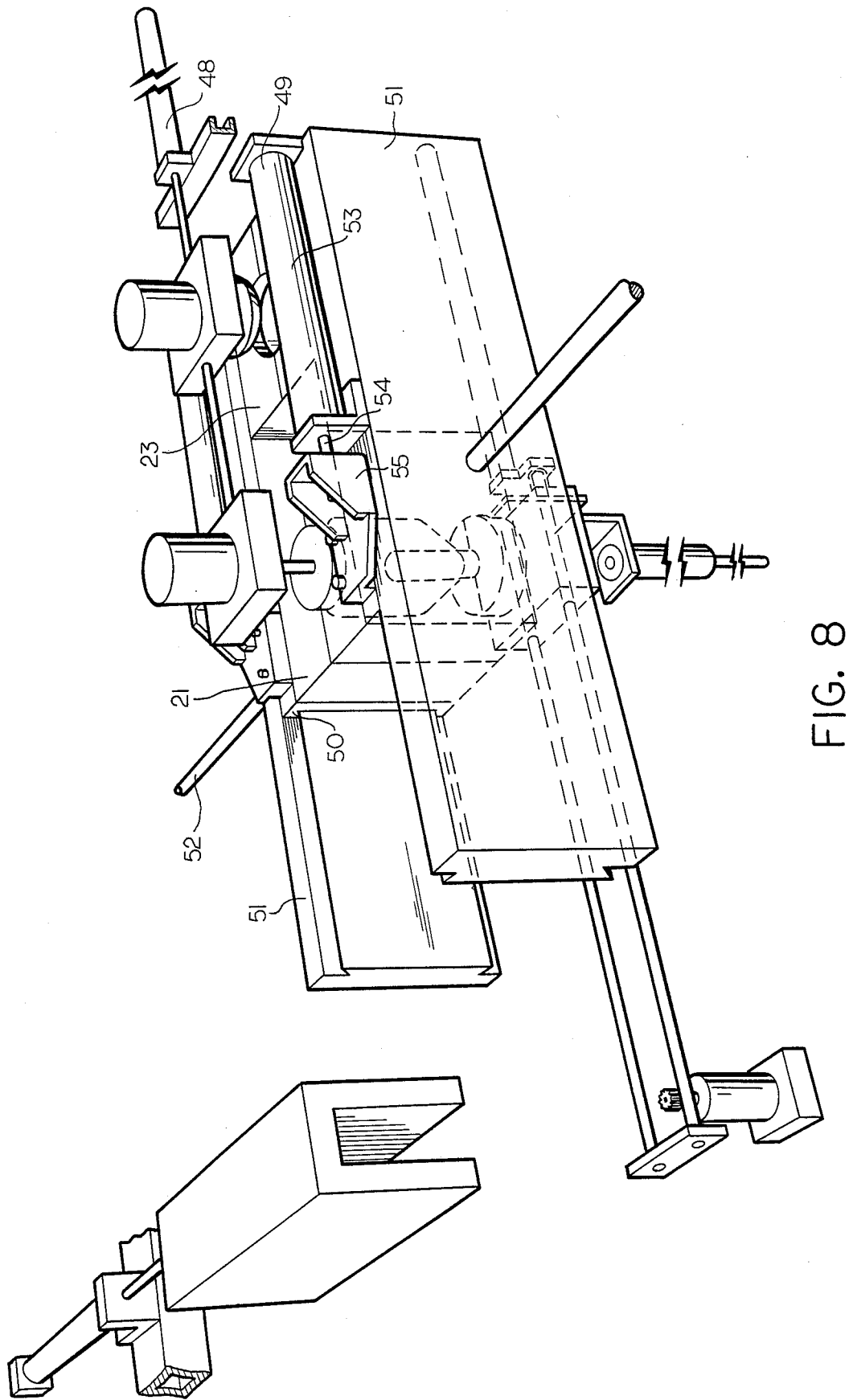
Figure 9:
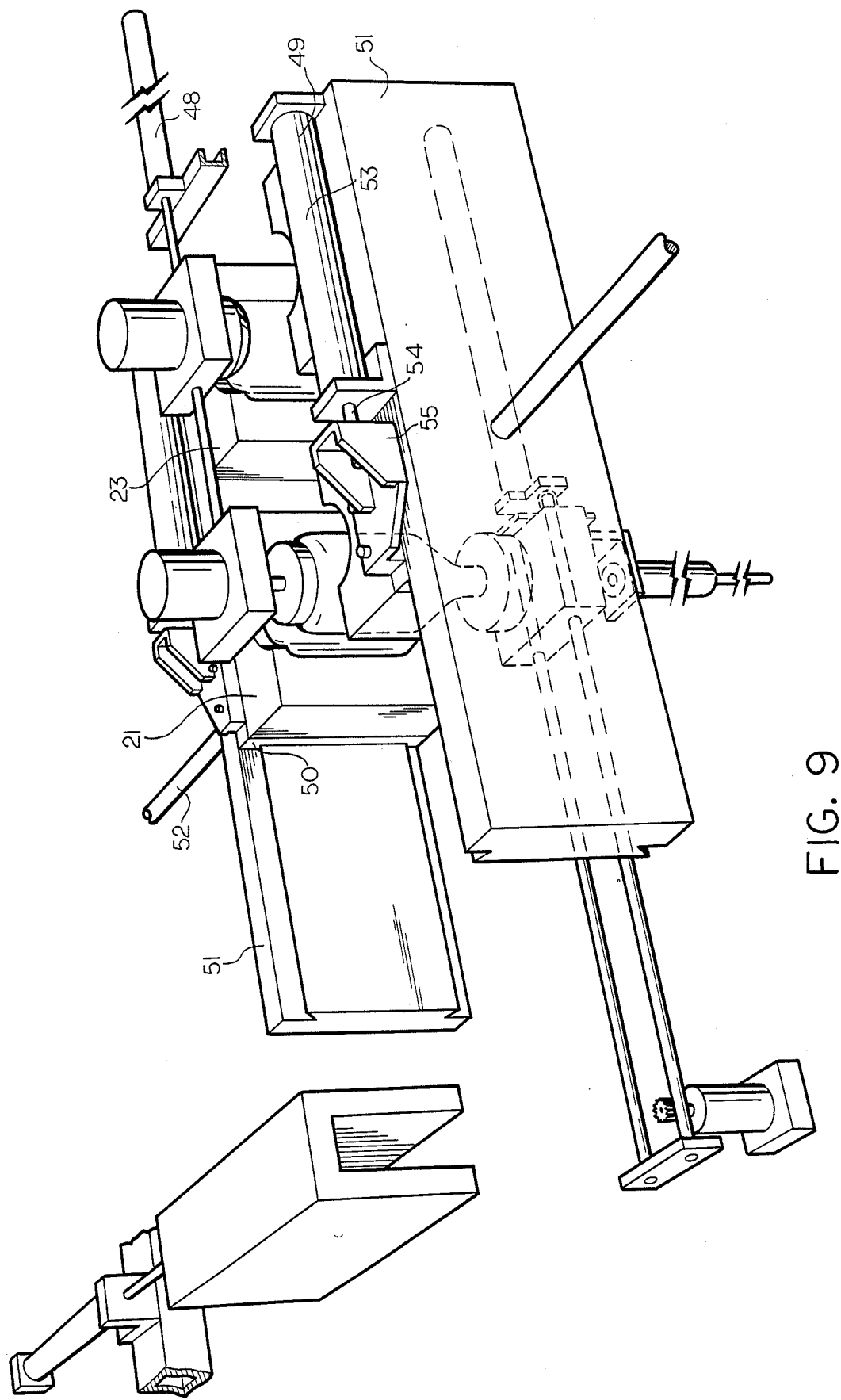
Figure 10:
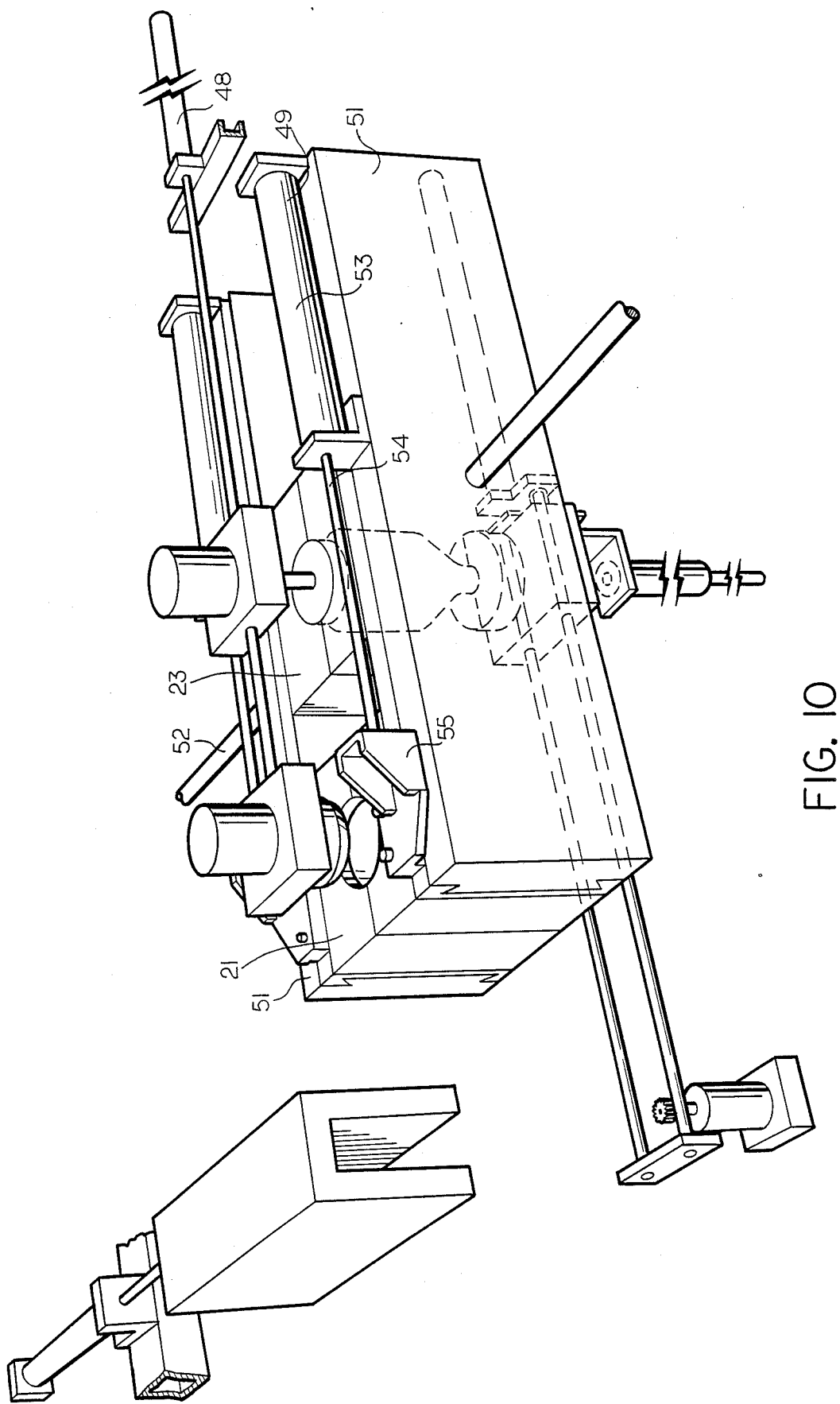
Figure 11:
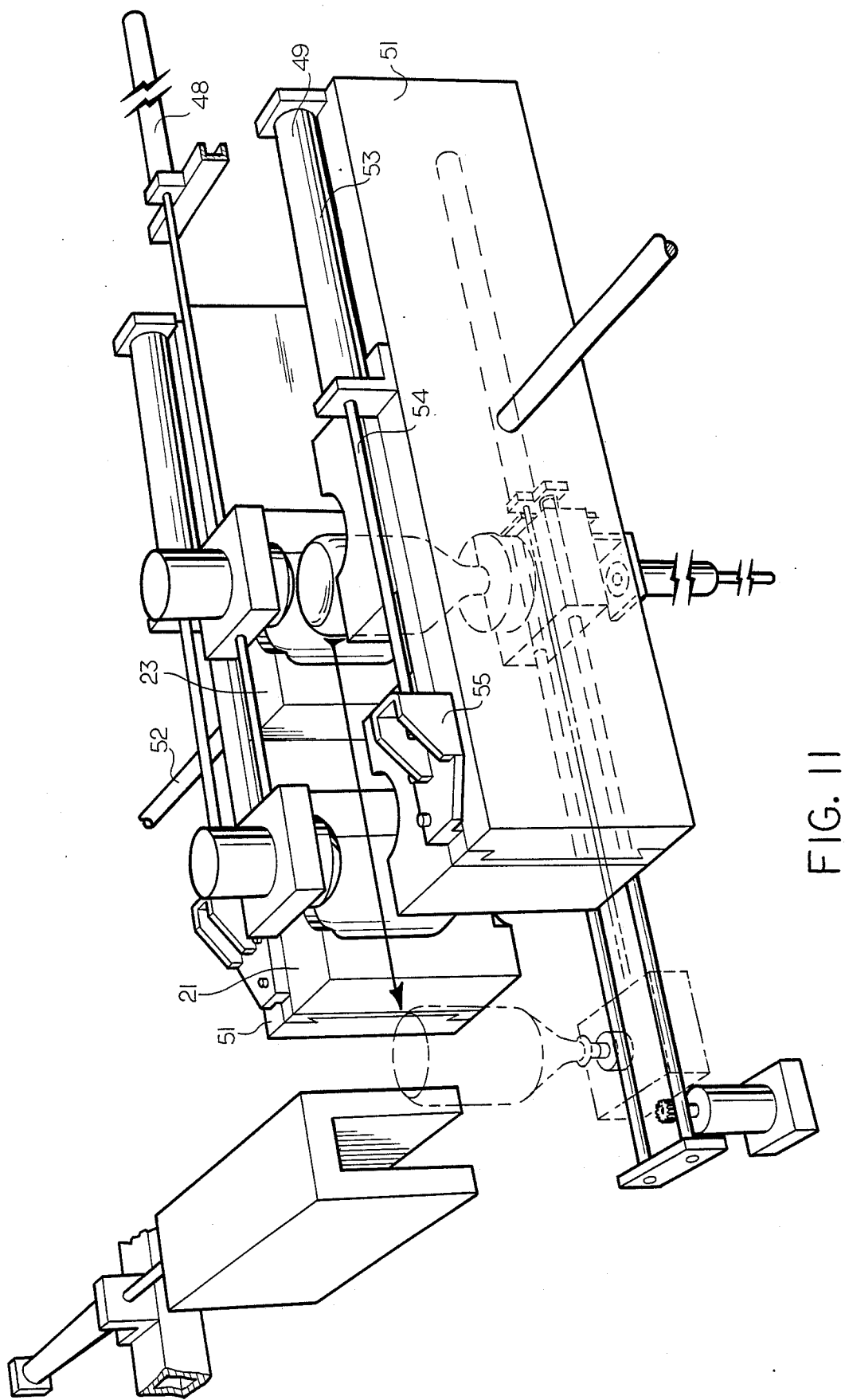
Figure 12:
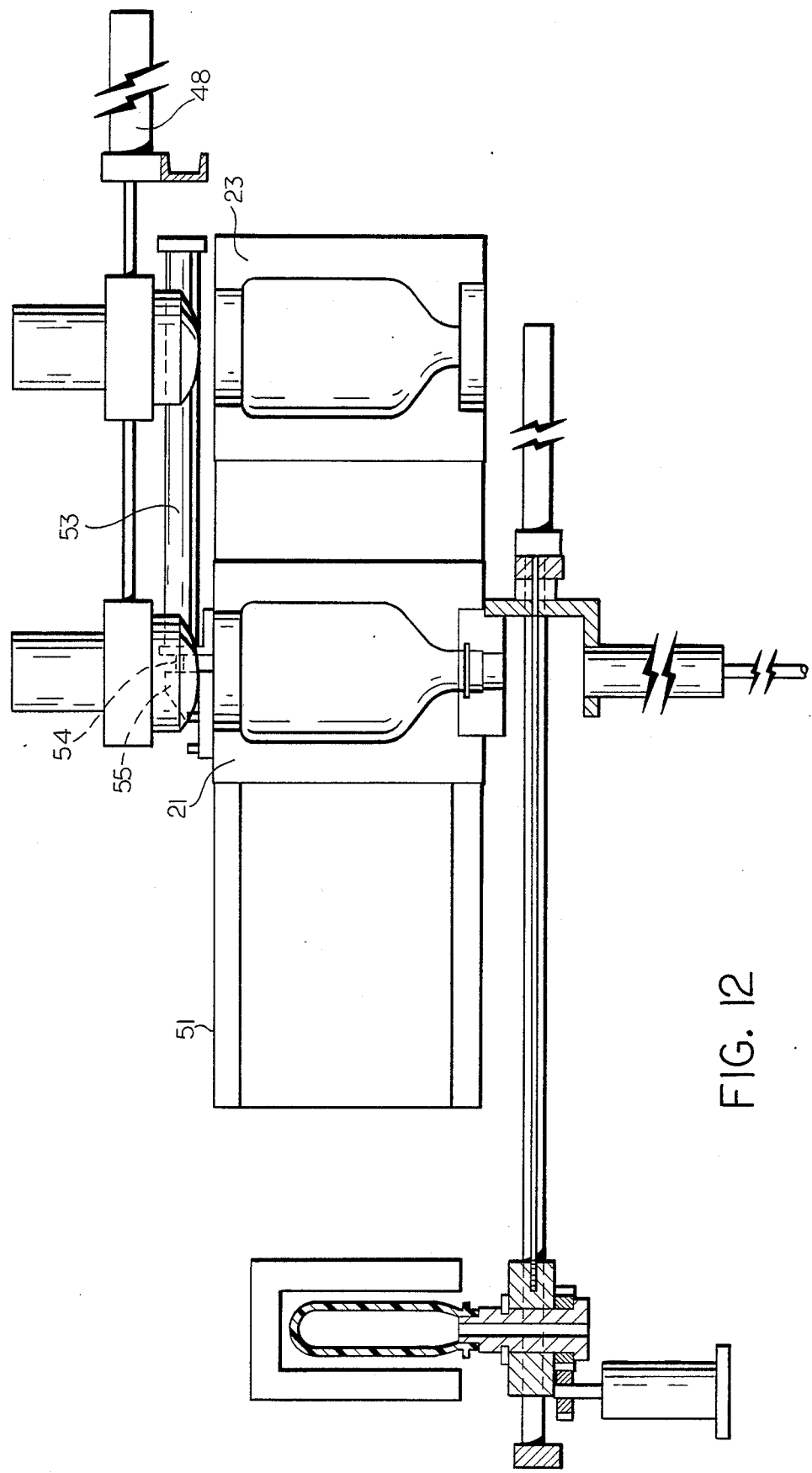
FIG. 12 is a longitudinal sectional view of the apparatus of FIGS. 7-11.

Referring to FIGS. 1-6, an apparatus for performing the method embodying the invention comprises a stationary hot mold 20 which comprises mold sections 21 movable toward and away from one another. The mold 20 is adapted to be heated so that when a parison is blown to the confines of the mold cavity, the resultant article is also heat set. The apparatus further includes a cold mold 22 that has mold sections 23 movable toward and away from one another to form a cavity substantially identical in size to the cavity of the mold 20.

A mold base 24, 25 is associated with each mold 20, 22 and provided with a cylinder 26, 27 for moving the mold base 24, 25 toward and away from its respective mold 20, 22.

The apparatus includes a conditioning station A at which a parison or preform P supported on a mandrel 28 is positioned for heating and equilibrating the parison P to an orientation temperature. The apparatus further includes a blowing and heat setting station B at the hot mold 20 and a quenching station C at the position of cold mold 22.

Mandrel 28 supporting a parison P is mounted on a block 29 movable on track 30 defined by spaced rods. The block 29 is connected to a piston rod 31 of a cylinder 32 mounted on a bracket 33 on which a clamping and blow pin assembly 34 is mounted. The bracket 33 is also mounted for movement on track 30. The clamping and blow pin assembly 34 comprises the halves of a clamp ring 34a and a blow pin assembly 34b.

A cylinder 40 at station A is adapted to rotate a pinion 41 which engages a gear 42 on the mandrel 28 to rotate the mandrel 28 at station A.

The clamping and blow pin assembly 34 is moved longitudinally on the track 30 by a rotary cylinder 47 which provides oscillating movement of an arm 46 which has a pin 43 thereon engaging a slot 44 in a link 45 fixed on bracket 33 to translate the bracket 33 and clamping and blow pin assembly 34 along track 30 between stations B and C.

Initially, a parison P is placed at position A on mandrel 28 and is heated to the orientation temperature in a heating channel H and maintained for a given period of time at the temperature in order to equilibrate the inside and outside temperature of the parison. The cylinder 32 is then actuated to bring the parison P to the hot blow molding and heat setting station B. The mold base cylinder 26 is then actuated to position the mold base 24 within the mold sections 21, the mold 20 is closed about the mold base 24 and neck clamp 34a. The parison is extended by fluid pressure through the blow pin assembly 34b to the confines of the hot mold 20 to produce a biaxially oriented container. The blowing fluid is first applied at a lower pressure, for example, 70 to 200 p.s.i., and then the blowing fluid is applied at a higher pressure, for example, 150 to 350 p.s.i., to maintain contact between the container and the surface of the mold. The contact with the confines of the mold is maintained by maintaining the internal pressurization for a given period of time to heat set the container. The blowing pressure is then reduced to a lower transfer pressure, the hot mold 20 is opened, the cylinder 26 is activated to move mold base 24 away from mold 20 and the clamping and blow pin assembly 34 is moved to the quenching station C.

During the transfer of the blown article to the cold mold, the article is maintained with the interior of the container under pressure in order to prevent significant shrinkage of the container. Inasmuch as the complex base of the container has been partially heat set and therefore crystallized, the lower interior pressure will not cause the bottom of the container to deform or revert to a hemispherical bottom. At the quenching station, cylinder 27 is actuated to position mold base 25 within the mold sections 23, the mold 22 is closed and the container is reblown against the confines of the cold mold 22 and quenched while maintaining the pressure within the container. The pressure is exhausted to atmospheric pressure. The cold mold 22 is then opened, cylinder 27 is then actuated to move mold base 25 away from mold 22, and the clamping and blow pin assembly 34 is returned to position B and mandrel 28 along with the container are returned to position A. The container is then removed.

In the modified method as shown in FIGS. 7–12, the clamping and blow pin assembly is maintained stationary while the hot mold 20 and cold mold 22 and associated mold bases 24, 25 and cylinders 26, 27 are moved longitudinally to transfer the blown container relative to the hot mold 20 and the cold mold 22. In this form, the mold halves 21, 23 are mounted on a slide 50 which in turn is mounted on a platen 51. The platens 51 are moved transversely in and out of position to open and close the molds by cylinders, not shown, the shafts 52 of which are shown. The movement of each slide 50 along the platen 51 is achieved by a cylinder 53 which has its piston rod 54 connected by a bracket 55 to slide 50.

In all other respects the method is substantially similar and the same cycle is provided.

Figure 14:
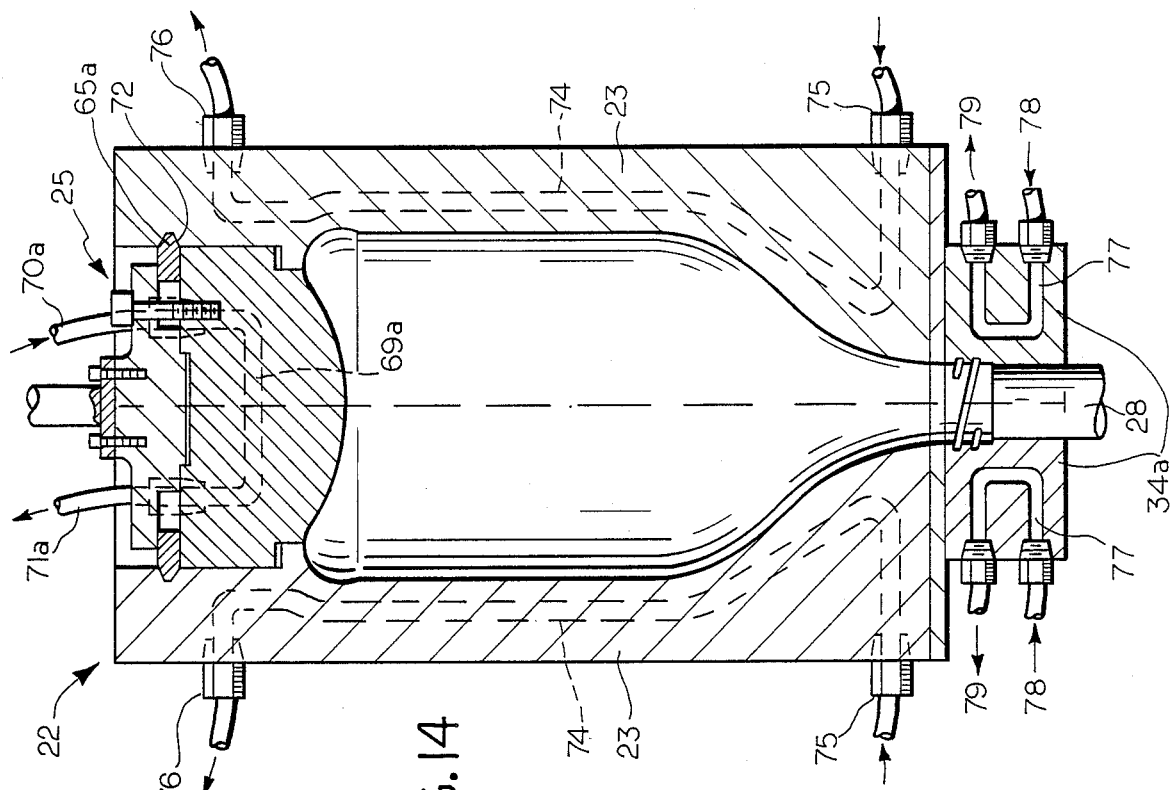
FIG. 14 is a sectional view of a cold mold that can be used in performing the method.
Figure 13:
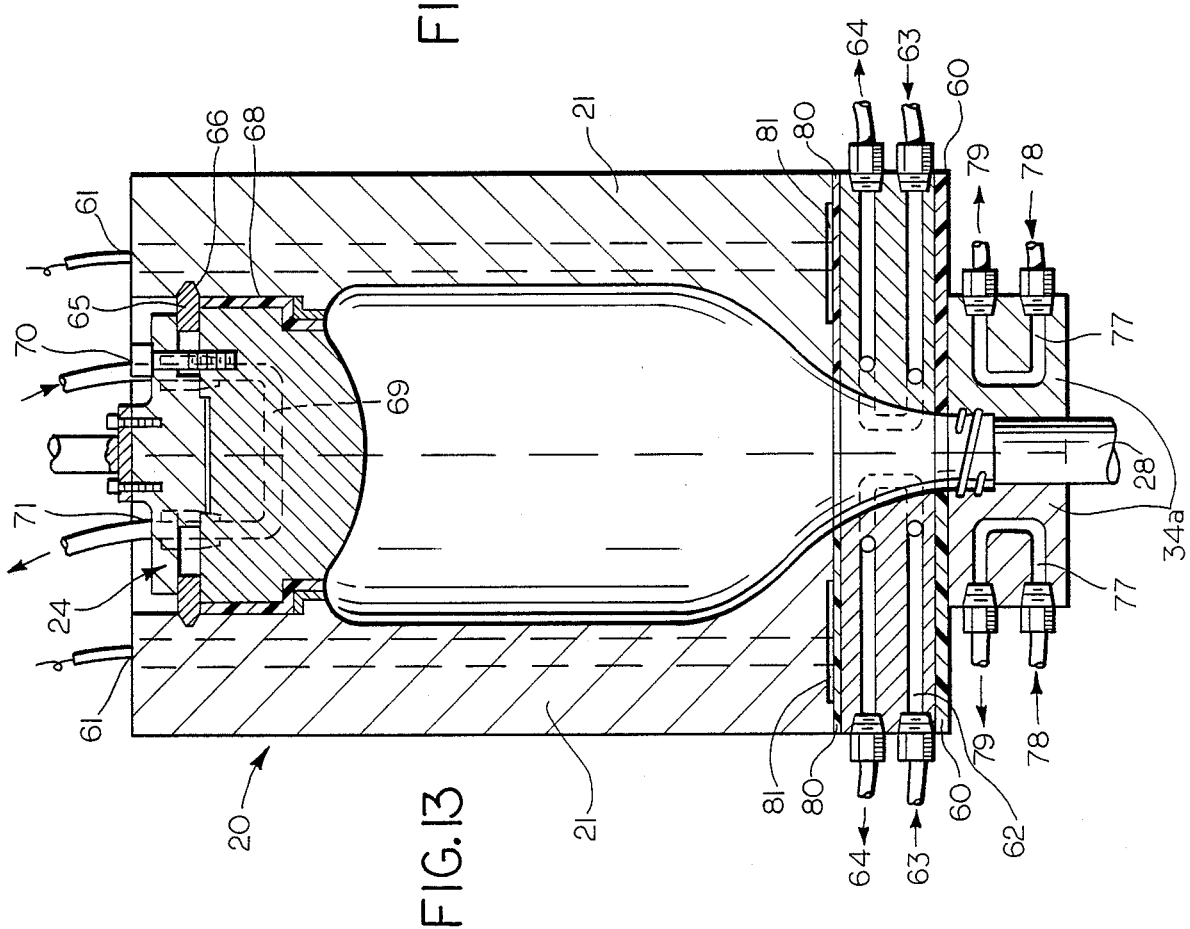
FIG. 13 is a sectional view of a hot mold that can be used in performing the method.

The specific hot and cold molds 20, 22 may have the construction as shown in FIGS. 13 and 14, respectively. Referring to FIG. 13, the mold 20 includes the mold halves 21, a shoulder forming portion 60, the clamping ring halves 34a and the mold base 24. The mold halves 21 are provided with circumferentially spaced longitudinally extending electric heaters 61. The mold part 60 is provided with coolant passages 62 in each half having an inlet 63 and an outlet 64. The mold base 24 has an annular ring 65 which engages semi-circular grooves 66 fixed to the upper end of the mold halves 21. An insulator in the form of a Teflon layer 68 is provided between the mold halves 21 and the mold base 24. Finally, the mold base 24 is provided with a passage 69 having an inlet 70 and an outlet 71 for the passage of fluid to control the temperature of the mold base 24. Each half of the finish clamp 34a is provided with a passage 77 having an inlet 78 and an outlet 79 for the passage of fluid to control the temperature of the clamp. An insulator layer 80 such as glass filled Teflon is provided between the shoulder forming portion 60 and mold halves 21. An air gap 81 is provided between each mold half 21 and the insulator layer 80.

The cold mold 22 shown in FIG. 14 similarly comprises the cold mold halves 23 of the cold mold 22 on the lower ends of which are engaged by the clamp rings 34a and the upper ends of which enclose a cold mold base 25. In this form, the ring 65a on mold base 25 engages semi-circular grooves 72 in the upper end of the mold halves 23 and no insulating layer is provided. Each half of the cold mold 22 is provided with a passage 74 having an inlet 75 and outlet 76 for the passage of fluid to control the temperature of the cold mold. Mold base 25 is provided with a passage 69a having an inlet 70a and an outlet 71a for the passage of cooling fluid to control the temperature of the mold base 25.

The process of the present invention, as well as the product, is especially concerned with polymers of polyethylene terephthalate having an inherent viscosity of at least 0.6. Polyethylene terephthalate polymers useful in the present invention include repeating ethylene terephthalate units with the remainder being minor amounts of ester-forming components and copolymers of ethylene terephthalate wherein up to about 10 mole percent of the copolymer is prepared from the monomer units selected from butane-1,4-diol; diethylene glycol; propane-1,3-diol; poly tetramethylene glycol); poly ethylene glycol); poly(propylene glycol); 1,4-hydroxymethylcyclohexane and the like, substituted for the glycol moiety in the preparation of the copolymer, or isophthalic; naphthalene 1,4- or 2,6dicarboxylic; adipic; sebacic; decane-1,10-dicarboxylic acids, and the like, substituted for up to 10 mole percent of the acid moiety (terephthalic acid) in the preparation of the copolymer.

Of course, the polyethylene terephthalate polymer can include various additives that do not adversely affect the polymer. For instance, some such additives are stabilizers e.g., antioxidants or ultraviolet light screening agents, extrusion aids, additives designed to make the polymer more degradable or combustible, and dyes or pigments. Moreover, cross-linking or branching agents such as are disclosed in U.S. Pat. No. 4,188,357 can be included in small amounts in order to increase the melt strength of the polyethylene terephthalate.

The process is also applicable to multilayer parisons comprising an orientable heat settable polymer and other polymers which provide desirable barrier properties wherein the orientable heat settable polymer comprises a major portion of the total weight, preferably at least 70%. Typical examples are multilayer parisons of polyethylene terephthalate and copolyester; polyethylene terephthalate, nylon and copolyester; polyethylene terephthalate, adhesive, nylon, glue and polyethylene terephthalate.

The process is also applicable to blends of polyethylene terephthalate with polymers which provide desirable barrier properties wherein the polyethylene terephthalate comprises a major portion of the total weight, preferably at least 70% of the total weight.

Thus, as used herein in the specification and claims, the term polyethylene terephthalate is intended to include the above polyethylene terephthalate containing materials.

In accordance with the invention, the following parameters produce optimum results:

TABLE I

| Heatset Parameters | |
|---|---|
| 1. Heatset mold temperature | 120–250° C. |
| 2. Heatset time | 1–30 sec. |
| 3. Hot Mold base temperature | 100–160° C. |
| 4. Transfer pressure | 1–30 p.s.i. |
| 5. Transfer time | 0.8–15 sec. |
| 6. Quench temperature - cold mold | 1–100° C. |
| 7. Quench temperature - cold mold base | 1–100° C. |
| 8. Quench time | 0.5–10 sec. |

It has been found that if the heat setting temperature of the base is less than 100° C., the base of the free standing container will deform and revert to a hemispherical configuration during transfer due to the lower transfer pressure. It has also been found that if the heat setting temperature of the base of the free standing container is higher than 160° C., the material of the base of the free standing container tends to stick to the mold base and also tend to revert to hemispherical shape during transfer. When the heat setting temperature of the base ranges between 100° and 160° C., the base of the free standing container will not deform and revert to a hemispherical configuration during transfer, the material of the base will not stick to the mold and the container will have high drop impact properties.

EXAMPLE

Four-liter free standing containers were satisfactorily produced in accordance with the invention using polyethylene terephthalate having an I.V. of 0.8. The containers were transferred using transfer mechanism shown in FIGS. 1–6 and FIGS. 13–14, in which the blow and clamping assembly is shuttled and the molds were stationary. The finish and shoulder adjacent the finish were water cooled to room temperature and the sidewall was heatset at 230° C. The bottom was kept at 105° C. during the blowing and heat setting. The containers were then transferred under 5 psi into a same size cold mold which was maintained at 22° C. and quenched.

Oxygen Permeability

Control and heatset containers were tested for whole package oxygen permeability at 73° F., 1 atm and 100% R.H. using PA-3 analyzer. The results are shown in Table II.

TABLE II

| | Oxygen Barrier Properties | | |
|---|---|---|---|
| Sample | Empty Weight (grams) | Oxygen Q-value at 73° F., 1 atm and 100% R.H. in cc/day atm | Improvement over Control |
| Non-heatset control - avg of 2 bottles | 130.72 | 0.370 | |
| Heatset - avg of two bottles | 131.0 | 0.243 | 34.3% |

It can thus be seen that heatset containers have showed over 34% improvement in oxygen barrier over non-heatset containers.

Mechanical Properties

Table III summarizes the mechanical properties and crystallinity for heatset and non-heatset containers.

TABLE III

| | | Mechanical Properties | | | |
|---|---|---|---|---|---|
| | | Control | | Heatset | |
| Property | | Axial | Hoop | Axial | Hoop |
| Modulus, | $\bar{x}$ | 352 | 674 | 363 | 632 |
| psi × 10³ | $\sigma$ | 4 | 21 | 25 | 14 |
| Yield stress, | $\bar{x}$ | 11.2 | 27.2 | 14.1 | 20.0 |
| psi × 10³ | $\sigma$ | 0.2 | 0.2 | 0.3 | 0.5 |
| Yield strain, | $\bar{x}$ | 7.8 | 6.0 | 8.3 | 6.0 |
| % | $\sigma$ | 0.3 | — | 0.2 | |
| Ultimate strength, | $\bar{x}$ | 16.4 | 33.6 | 12.0 | 40.1 |
| psi × 10³ | $\sigma$ | 0.8 | 1.1 | 0.3 | 1.2 |
| Ultimate | $\bar{x}$ | 101 | 20 | 38 | 30 |
| elongation, % | $\sigma$ | 6 | 1 | 10 | 2 |
| Density, gm/cc (in side wall) | | | | | |
| Position 1 | | 1.400 | | | |
| Position 2 | | 1.400 | | | |
| Position 3 | | 1.4012 | | | |

It can thus be seen that acceptable mechanical properties and density were obtained.

Modulus, yield stress, yield strain, ultimate strength and ultimate elongation were measured as defined in ASTM Standard D-638. Density was determined by ASTM 1505.

Drop Test

Heatset and non-heatset control containers were subjected to drop impact tests. In this test, one set of containers were filled with water at room temperature and dropped on a concrete floor. Another set of containers were filled with water at room temperature, stored at 40° F. for 24 hours and then the test was conducted. Table IV summarizes the results of the drop test.

TABLE IV

| Drop Test 4 Liter Free Standing Containers Total Containers Tested for each Set = 6 | | | | |
|---|---|---|---|---|
| | Temperature of test = 73° F. | | Temperature of test = 40° F. | |
| | Non-heatset | Heatset | Non-heatset | Heatset |
| Failure <3 ft | 0 | 0 | 0 | 0 |
| Failure <4 ft | 0 | 0 | 0 | 0 |
| Failure <5 ft | 0 | 0 | 0 | 0 |
| Failure <6 ft | 0 | 0 | 0 | 0 |
| Failure <7 ft | 0 | 0 | 0 | 0 |
| Failure <8 ft | 0 | 0 | 0 | 0 |
| Failure <9 ft | 0 | 0 | 0 | 0 |

Tests at room temperature and lower temperatures passed the drop test. There were no failures observed even when bottles were dropped from 9 feet.

It can thus be seen that satisfactory drop impact properties were obtained by controlling the extent of crystallization in the base. This was achieved by confining the heat setting range of the base between 100° and 160° C.

The method can be utilized with a hot mold and a cold mold wherein the cold mold is larger than the hot mold, as described in the aforementioned U.S. Pat. No. 4,522,779; or wherein the cold mold has the same volume as the hot mold, or smaller volume, as described in the above identified pending U.S. application Ser. No. 923,503, which is incorporated herein by reference. Where the method of U.S. Pat. No. 4,522,779 is utilized, the resultant container exhibits improved mechanical properties but will have lower onset-of-shrinkage and reduced hot filling capability. The container can be utilized when the contents are pressurized.

Where the method of U.S. application Ser. No. 923,503 is utilized, the resultant container will have a higher onset-of-shrinkage temperature and therefore the container can be hot filled at higher temperatures.

If desired, an axial stretch may be applied to the parison by use of a stretch rod either before expanding the parison or simultaneously with the expanding of the parison, as is well known in the art.

Although the method has been described by utilizing parisons which are heated and then blown and heat set, some of the advantages are also applicable to heat setting previously blown containers which are positioned between the halves of a hot mold at station B to heat set the container and then transferred to a cold mold at station C while maintaining engagement of the neck.

It can thus be seen that there has been provided a method of making biaxially oriented heat set free standing polyethylene terephthalate containers; which method has lower cycle times; where the hot mold in which the container is blown and heat set can be opened sooner without deformation of the bottom as would occur due to internal pressure which is used to handle the container without shrinkage; which method permits the container to be transferred more rapidly between a hot mold and a cold mold; which method does not require maintaining contact between a mold base and the bottom or base of the container during movement from a hot mold to a cold mold. The resultant containers have satisfactory mechanical properties, density, drop impact properties and barrier properties.

Claims:

1. A method for making a partially crystalline, biaxially oriented heatset hollow polyethylene terephthalate free standing container from a hollow parison having an open end and a closed end comprising engaging the open end of a polyethylene terephthalate parison which is at a temperature within its molecular orientation temperature range, axially positioning a heated mold base in axial alignment with said engaged hot parison, said heated mold base having a configuration to form a free standing base on a container, enclosing a hot mold about the heated mold base, said mold being at heatsetting temperature, said heated mold base being at a heatsetting temperature substantially less than the temperature of said hot mold, expanding said plastic parison within said hot mold by internal pressurization through the open end to induce biaxial orientation of the plastic parison and force the parison into intimate contact and conformance with the hot mold and to maintain contact by such internal pressurization between the mold and the biaxially oriented container for a time sufficient to induce partial crystallization in the sidewalls of biaxially oriented container and a lesser heat setting and crystallization in the free standing base of the container sufficient such that the bottom of the free standing base will not deform or revert to a hemispherical shape under the internal pressure when the mold is opened and the mold base is moved axially out of engagement with the heated hollow container, reducing the internal pressure in the blown container, opening the hot mold while maintaining engagement with the open end of the hot blown hollow container, moving the heated mold base axially out of engagement with the hot blown hollow container, maintaining a lower internal pressurization within the hot container sufficient to prevent the container from expanding so that it will be pinched when a cold mold is closed about it and sufficient to prevent a significant shrinkage, and transferring the biaxially oriented container while maintaining engagement with the open end of the hot container adjacent a cold mold which is at a temperature substantially less than the temperature of the hot mold by relatively moving the container and while maintaining the reduced internal pressurization;

the temperature of the heated mold base ranging between 100° C. and 160° C. such that the temperature is sufficiently high that the base of the container will not deform and will not revert to a hemispherical configuration due to the pressure in the blown container during transfer to the cold mold and the temperature of the mold base is sufficiently low that the base of the blown container will not stick to the mold base and will not revert to a hemispherical configuration during transfer of the blown container to the cold mold, bringing a cold mold base into engagement with the base of the container, said cold mold base being at a temperature not greater than 100° C.

enclosing the container in a cold mold by closing the cold mold about said cold mold base, said cold mold being at a temperature not greater than 100° C., holding the container against the confines of the cold mold by maintaining pressure within the container for a time sufficient to cool the container and to prevent shrinkage upon removal from the cold mold, exhausting the pressure in the container, opening the cold mold, removing the container, said heat setting temperature of said sidewall ranging between about 120°–250° C., said heat set time ranging between about 1–30 seconds, the time for transferring ranging between about 0.8–15 seconds.

2. The method set forth in claim 1 wherein said relative movement between the container and the hot mold and cold mold is achieved by moving the container while maintaining the hot mold and hot mold base and the cold mold and cold mold base stationary.

3. The method set forth in claim 1 wherein said relative movement between the container and the hot mold and cold mold is achieved by moving the hot mold and hot mold base and the cold mold and cold mold base relative to the container.

4. The method set forth in claim 1 including the step of moving the cold mold base axially away from the container after the cold mold is opened.

5. The method set forth in claim 1 including the step of heating the hot parison to the molecular orientation temperature and the step of transferring the hot parison to a position adjacent the hot mold.

6. A method of making a partially crystalline biaxially oriented heatset hollow polyethylene terephthalate free standing container from a hollow parison having an open end and a closed end comprising engaging the open end of a previously formed hollow diaxially oriented container having a free standing base, which has been made by expanding a polyethylene terephthalate parison at a temperature within its molecular orientation temperature, positioning a heated mold base in axial engagement with the base of said container, said heated mold base having a configuration conforming with the free standing base of a container, enclosing a hot mold about the heated mold base, said mold being at heatsetting temperature, said heated mold base being at a heatsetting temperature substantially less than the temperature of said hot mold, applying internal pressure in the previously formed container within said hot mold for applying internal pressurization to said container to hold the container in intimate contact and conformance with the hot mold and to maintain contact by such internal pressurization between the mold and the biaxially oriented container for a time sufficient to induce partial crystallization in the sidewalls of the biaxially oriented container and a lesser heat setting and crystallization in the free standing base of the container sufficient such that the bottom of the free standing base will not deform or revert under the internal pressure when the mold is opened and the mold base is moved axially out of engagement with the heated hollow container, reducing the internal pressure in the container, opening the hot mold while maintaining engagement of the open end of the heated hollow container, moving the heated mold base axially out of engagement with the heated hollow container, maintaining a lower internal pressurization of the container sufficient to prevent the container from expanding so that it will be pinched when a cold mold is closed about it and sufficient to prevent significant shrinkage, transferring the biaxially oriented container adjacent a cold mold which is at a temperature substantially less than the temperature of the hot mold by relatively moving the container and while maintaining the reduced internal pressurization, the temperature of the heated mold base ranging between 100° C. and 160° C. such that the temperature is sufficiently high that the base of the container will not deform and will not revert to a hemispherical configuration due to the pressure in the blown container during transfer to the cold mold and the temperature of the mold base is sufficiently low that the base of the container will not stick to the mold base and will not revert to a hemispherical configuration during transfer of the container to the cold mold, bringing a cold mold base into engagement with the base of the container, said cold mold base being at a temperature not greater than 100° C, enclosing the container in a cold mold by closing the cold mold about said cold mold base, said cold mold being at a temperature not greater than 100° C., holding the container against the confines of the cold mold by maintaining pressure for a time sufficient to cool the container and to prevent shrinkage upon removal from the cold mold, opening the cold mold, removing the container, said heat setting temperature of said sidewalls ranging between about 120°–250° C., said heat set time ranging between about 1–30 seconds, the time for transferring ranging between about 0.8–15 seconds.

* * * * *